US006264407B1

(12) United States Patent
Tinken

(10) Patent No.: US 6,264,407 B1
(45) Date of Patent: Jul. 24, 2001

(54) PORTABLE ELECTRIC RAILROAD RAIL DRILL APPARATUS

(76) Inventor: Randy J. Tinken, 401 N. Burma Ave., Gillette, WY (US) 82716

( * ) Notice: Subject to any disclaimer, the term of this patent is extended or adjusted under 35 U.S.C. 154(b) by 0 days.

(21) Appl. No.: 09/273,870

(22) Filed: Mar. 22, 1999

(51) Int. Cl.$^7$ ................................................. B23B 45/14
(52) U.S. Cl. ............................ 408/136; 408/712; 82/105
(58) Field of Search ................................. 408/136, 124, 408/88, 712; 82/105

(56) References Cited

U.S. PATENT DOCUMENTS

| 1,391,725 | * | 9/1921 | Everett . | |
|---|---|---|---|---|
| 1,634,943 | * | 7/1927 | Honl . | |
| 1,841,798 | * | 1/1932 | Everett . | |
| 2,187,111 | * | 1/1940 | Chandler | 77/8 |
| 2,376,524 | * | 5/1945 | Talboys et al. | 77/8 |
| 2,887,908 | * | 5/1959 | Miller | 77/11 |
| 3,068,722 | * | 12/1962 | Carion | 408/136 |
| 3,706,505 | * | 12/1972 | Stougaard | 408/78 |
| 3,945,749 | * | 3/1976 | McIlrath | 408/95 |
| 4,268,196 | * | 5/1981 | Harrow et al. | 408/39 |
| 4,753,556 | * | 6/1988 | Solko | 408/16 |
| 5,203,650 | * | 4/1993 | McCourtney | 408/1 R |
| 5,244,048 | * | 9/1993 | Moorhead, Sr. | 408/136 X |
| 5,322,397 | * | 6/1994 | Spear | 408/136 X |
| 5,348,428 | * | 9/1994 | Turner | 408/136 X |

* cited by examiner

Primary Examiner—Henry W. H. Tsai
(74) Attorney, Agent, or Firm—Flanagan & Flanagan; John R. Flanagan; John K. Flanagan

(57) ABSTRACT

A portable electric railroad rail drill apparatus includes an elongated main shaft, a support frame, an electric drill, a clamp, a handle and a support leg. The support frame is reciprocally mounted to the main shaft for movement therealong between first and second ends of the main shaft. The electric drill is fixedly mounted to the support frame and reciprocally movable therewith along the main shaft. The clamp is mounted at a location adjacent to the first end of the main shaft for mounting the main shaft to a railroad track rail such that the electric drill is disposed adjacent to the rail and movable along the main shaft toward and away from the rail and is operable for drilling a hole through the rail concurrently with movement toward the rail. The handle is pivotally mounted to the main shaft and pivotally coupled to the support frame and extends upwardly therefrom such that the handle can be pivotally moved between forward and rearward positions to cause movement of the support frame along the main shaft and thereby the electric drill toward and away from the rail for drilling the hole through the rail and removing the electric drill from the hole. The support leg is mounted to the second end of the main shaft and extends in a substantially transverse relation thereto such that the support leg rests on the ground and supports and retains the second end of the main shaft above the ground.

20 Claims, 4 Drawing Sheets

PORTABLE ELECTRIC RAILROAD RAIL DRILL APPARATUS

BACKGROUND OF THE INVENTION

1. Field of the Invention

The present invention generally relates to devices for drilling railroad rails and, more particularly, is concerned with a portable electric railroad rail drill apparatus.

2. Description of the Prior Art

A typical railroad track has a pair of elongated rails. The pair of rails receive wheels of train cars thereon. The rails are spaced laterally apart from one another and extend longitudinally and in substantially parallel relation to one another. Each rail has an upright configuration with a top portion, a base portion and an intermediate portion which extends between and interconnects the top portion and the base portion. The base portion is mounted to the ground. The wheels of train cars, particularly, rest on and roll along the top portion. Items, such as sensors, electrical cables, splices and the like, may be mounted to the rails.

Drill devices are employed to form holes in and through the intermediate portions of the rails. Fasteners are inserted through the holes to mount items, such as those mentioned above, to the rails. Railroad tracks are also laid in sections. Ends of adjacent track sections must be attached to one another. The rails of the adjacent track sections are arranged such that the holes of the intermediate portions of the rails are aligned so fasteners may be inserted through the aligned holes to secure the rails and thereby the ends of adjacent track sections to one another in the process of laying a track.

In the past, crews have used gasoline powered drill devices to form the holes in the intermediate portions of the rails. These drill devices generally consist of a gasoline engine, a mounting frame and a horizontal drill press. Problems exist, however, with these drill devices in that they are cumbersome, heavy and unreliable in cold weather. These problems impair the precision and ease of use of the drill devices.

A variety of drill devices have been developed over the years. Representative examples of drill devices are disclosed in U.S. Pat. No. 1,391,725 to Everett, U.S. Pat. No. 1,634,943 to Honl, U.S. Pat. No. 1,841,798 to Everett, U.S. Pat. No. 2,187,111 to Chandler, U.S. Pat. No. 2,376,524 to Talboys et al., U.S. Pat. No. 2,887,908 to Miller, U.S. Pat. No. 3,706,505 to Stougaard, U.S. Pat. No. 4,268,196 to Harrow et al., U.S. Pat. No. 4,753,556 to Solko and U.S. Pat. No. 5,203,650 to McCourtney. While these prior art drill devices may be satisfactory in use for the specific purposes for which they were designed, many of them appear to have the same above-mentioned problems associated with gasoline powered drill devices.

Consequently, a need still exists for a drill apparatus which provides a solution to the aforementioned problems in the prior art without introducing any new problems in place thereof.

SUMMARY OF THE INVENTION

The present invention provides a portable electric railroad rail drill apparatus designed to satisfy the aforementioned need. The portable electric railroad rail drill apparatus of the present invention is compact and lightweight. The portable electric railroad rail drill apparatus is generally more reliable than the prior art gasoline powered drill devices. The portable electric railroad rail drill apparatus is also more precise and easier to use than prior art drill devices.

Accordingly, the present invention is directed to a portable electric railroad rail drill apparatus which comprises: (a) an elongated main shaft having opposite first and second ends; (b) a support frame reciprocally mounted to the main shaft for movement therealong between the first and second ends of the main shaft; (c) an electric drill fixedly mounted to the support frame and reciprocally movable therewith along the main shaft; (d) means for mounting the main shaft at a location adjacent to the first end thereof to a railroad track rail such that the drill is disposed adjacent to the rail and movable along the main shaft toward and away from the rail and is operable for drilling a hole through the rail concurrently with movement toward the rail; (e) a handle; and (f) means for pivotally mounting the handle to the main shaft such that the handle can be pivotally moved between forward and rearward positions relative to the rail to cause movement of the support frame along the main shaft and thereby the drill toward and away from the rail for drilling the hole through the rail and removing the drill from the hole.

More particularly, the drill is disposed below the main shaft. The shaft mounting means includes a clamp mounted at the location adjacent to the first end of the main shaft. The clamp includes a pair of jaws. One jaw of the clamp is movable toward and away from the other jaw. The jaws receive the rail therebetween such that movement of the one jaw toward the other jaw tightens the jaws onto the rail and movement of the one jaw away from the other jaw loosens and allows removal of the jaws from the rail such that the clamp removably mounts the main shaft to the rail. The shaft mounting means also includes a wing nut rotatably mounted to the first end of the main shaft and movable toward and away from the jaws such that rotation of the wing nut in one direction moves the wing nut toward the jaws and thereby tightens the jaws and rotation of the wing nut in an opposite direction moves the wing nut away from the jaws and thereby loosens the jaws.

The handle also is convertable between a stored condition and an employed condition. The handle in the stored condition is mounted to the clamp and extends above and adjacent to the main shaft. The handle in the employed condition is pivotally mounted to the main shaft and extends upwardly therefrom. The handle has a base portion which is pivotally mounted to the main shaft and a main portion which removably fits with the base portion.

The apparatus further comprises a support leg convertable between a stored condition and a deployed condition. The support leg in the stored condition is mounted to the clamp and extends above and adjacent to the main shaft. The support leg in the deployed condition is mounted to the second end of the main shaft and extends in a substantially transverse relation thereto such that the support leg rests on the ground and supports and retains the second end of the main shaft above the ground.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
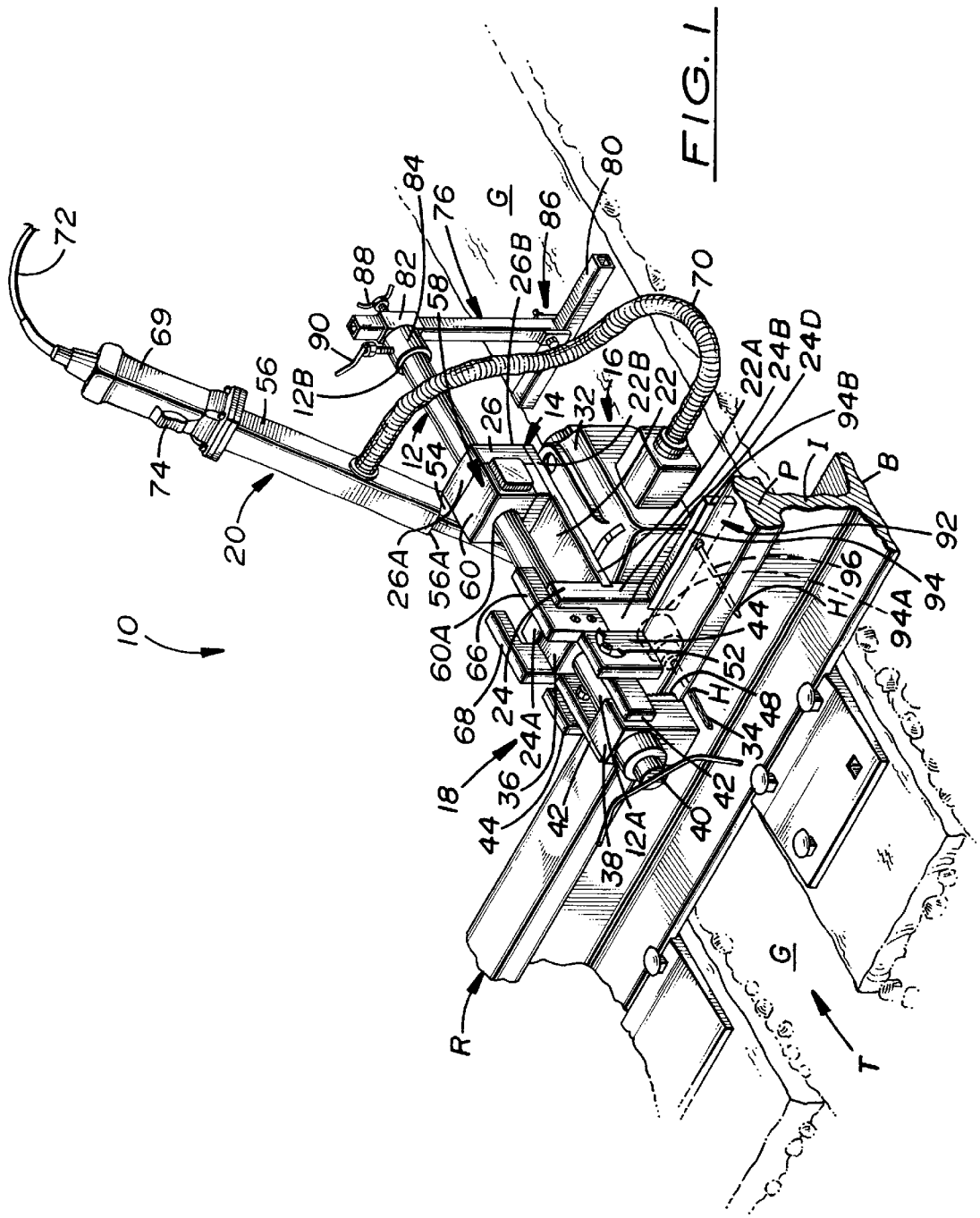
FIG. 1 is a perspective view of a portable electric railroad rail drill apparatus of the present invention mounted to a rail of a railroad track showing a handle of the apparatus in an employed condition and rearward position.

Referring to the drawings and particularly to FIG. 1, there is illustrated a portable electric railroad rail drill apparatus, generally designated 10, of the present invention. Basically, the portable electric railroad drill apparatus 10 includes an elongated main shaft 12, a support frame 14, an electric drill 16, a shaft mounting means 18 and a handle 20. The main shaft 12 has opposite first and second ends 12A, 12B. The support frame 14 is reciprocally mounted to the main shaft 12 for undergoing movement therealong between the first and second ends 12A, 12B thereof. The electric drill 16 is fixedly mounted to the frame 14 and is reciprocally movable therewith along the main shaft 12. The shaft mounting means 18 is operable for mounting the main shaft 12 at a location adjacent the first end 12A thereof to a rail R of a railroad track T such that the electric drill 16 is disposed adjacent to the rail R and movable along the main shaft 12 toward and away from the rail R and is operable for drilling a hole H through the rail R concurrently with movement toward the rail R. The handle 20 is pivotally mounted to the main shaft 12 and extends upwardly therefrom and is pivotally coupled to the support frame 14 and movable between a forward position, shown in dashed line form in FIGS. 3 and 4, and a rearward position, shown in solid line form in FIGS. 1, 3 and 4, to cause movement of the support frame 14 and thereby the electric drill 16 toward and away from the rail R for drilling the hole H through the rail R and removing the electric drill 16 from the hole H.

Referring now to FIGS. 1 to 4, the main shaft 12 of the drill apparatus 10 is an elongated bar having a rigid construction and comprised of a suitable metal material, such as steel. The main shaft 12 has a substantially straight longitudinal configuration and a substantially cylindrical transverse configuration. The length of the main shaft 12 is substantially greater than the diameter thereof. The support frame 14 of the drill apparatus 10, which is mounted for slidable movement along the main shaft 12, includes a horizontal plate 22, a pair of spaced apart forward and rearward vertical plates 24, 26 and a side vertical plate 28.

Figure 4:
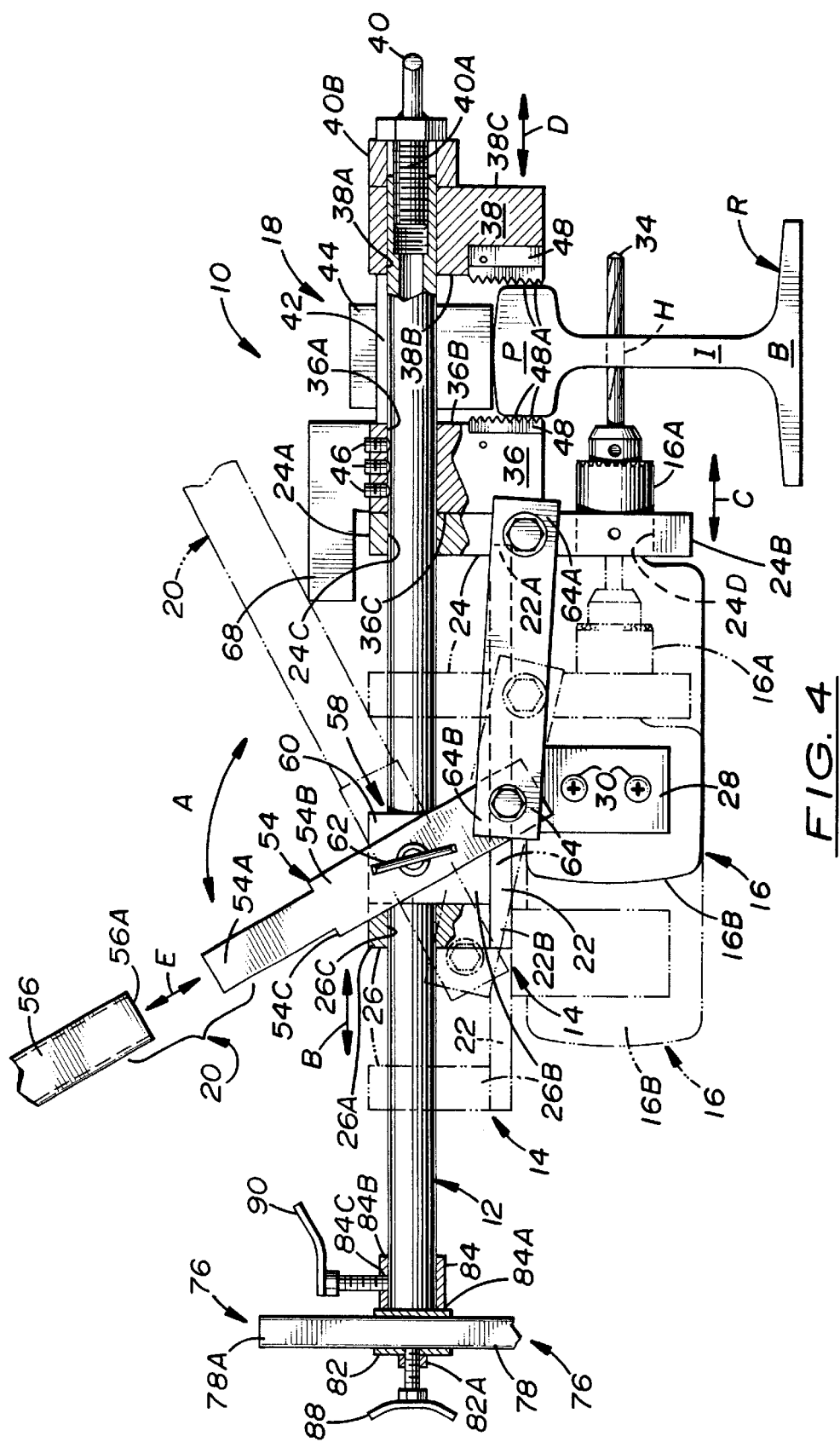
FIG. 4 is another side elevational view of the apparatus on a larger scale than that of FIG. 3, showing reciprocal movement of a support frame and an electric drill of the apparatus with pivotal movement of the handle between forward and rearward positions.

The horizontal plate 22 of the support frame 14 has a substantially flat rectangular configuration with a front end 22A and a rear end 22B. Each of the vertical plates 24, 26 has a substantially flat rectangular configuration with the length of the forward vertical plate 24 being greater than the length of the rearward vertical plate 26. Each of the vertical plates 24, 26 has an upper end 24A, 26A and a lower end 24B, 26B. The horizontal plate 22 is fixedly mounted at its rear end 22B to and is disposed below the lower end 26B of the rearward vertical plate 26. The horizontal plate 22 is fixedly mounted at its front end 22A to the forward vertical plate 24 at an intermediate point between the upper end 24A and the lower end 24B thereof. As seen in FIG. 4, the rearward vertical plate 26 has an opening 26C defined therethrough receiving the main shaft 12 while the forward vertical plate 24 has an upper opening 24C and a lower opening 24D respectively receiving the main shaft 12 and a forward portion 16A of the electric drill 16. Thus, the support frame 14 via the openings 24C, 26C of its forward and rearward vertical plates 24, 26 is mounted to the main shaft 12 for undergoing reciprocable sliding movement therealong between the first and second ends 12A, 12B of the main shaft 12. The side vertical plate 28 has a substantially flat rectangular configuration with an upper end 28A and a lower end 28B. The side vertical plate 28 is mounted at its upper end 28A to and is disposed below the horizontal plate 22 between the front and rear ends 22A, 22B thereof but closer to the rear end 22B than to the front end 22A thereof. The electric drill 16 is secured at one side by screws 30 to the side vertical plate 28 of the support frame 14 such that the electric drill 16 is supported by the support frame 14 below the main shaft 12 and for reciprocable movement therealong with the support frame 14.

The electric drill 16 of the drill apparatus 10 is a conventional type per se having an electric motor 32 and a drill bit 34. The drill 16 has the front portion 16A and a rear portion 16B and is disposed below the horizontal plate 22 of the support frame 14 and also below the main shaft 12. As mentioned above, the drill 16 is mounted at its front portion 16A to and is disposed through the lower opening 24D of the forward vertical plate 24 of the support frame 14 and is mounted at the side of its rear portion 16B to the side vertical plate 28 of the support frame 14. Each rail R has an upright configuration with a top portion P, a base portion B and an intermediate portion I which extends between and interconnects the top portion P and the base portion B. The hole H made by the drill 16 is through the intermediate portion I of the rail R.

The shaft mounting means 18 of the drill apparatus 10 is in the form of a clamp 18 mounted at the location adjacent to the first end 12A of the main shaft 12. The clamp 18 includes a pair of jaws 36, 38, a wing nut 40, a pair of jaw guiding members 42 and a pair of rail gauging members 44. The jaws 36, 38 have substantially block-like configurations and openings 36A, 38A receiving the first end 12A of the main shaft 12 therethrough. The jaw 36 is stationary, being fixedly attached by set screws 46 to the main shaft 12 The jaw 38 is movable, being slidably mounted along the main shaft 12 toward and away from the stationary jaw 36. The jaws 36, 38 have respective front ends 36B, 38B facing toward one another, respective rear ends 36C, 38C facing in opposite directions, and pairs of opposite lateral sides 36D, 38D. Each jaw 36, 38 has a gripping plate 48 with a plurality of teeth 48A formed thereon being mounted to the front end 36B, 38B of the respective stationary and slidable jaws 36, 38 below the openings 36A, 38A thereof. The gripping plates 48 of the jaws 36, 38 are aligned with one another.

The stationary and slidable jaws 36, 38 are spaced from one another on the main shaft 12 for receiving the railroad track rail R therebetween below the main shaft 12. Movement of the slidable jaw 38 toward the stationary jaw 36 tightens the two jaws 36, 38 onto the rail R while movement of the slidable jaw 38 away from the stationary jaw 36 loosens and allows removal of the jaws 36, 38 from the rail R such that the clamp 18 removably mounts the main shaft 12 to the rail R. The teeth 48A on the gripping plates 48 of the jaws 36, 38 contact the opposite sides of and retain the jaws 36, 38 in place on the top portion P of the rail R when the jaws 36, 38 are tightened onto the rail R.

The wing nut 40 is rotatably mounted to the first end 12A of the main shaft 12 and is movable toward and away from the jaws 36, 38 of the clamp 18. The wing nut 40 is disposed against the rear end 38C of the slidable jaw 38 and moves the slidable jaw 38 relative to the stationary jaw 36. More particularly, the wing nut 40 has an externally threaded stem 40A which threads into the internally threaded end 12A of the main shaft 12 and brings an enlarged head 40B of the wing nut 40 into engagement with the slidable jaw 38 forcing it to move toward the stationary jaw 36. Thus, rotation of the wing nut 40 in one direction moves the head 40B thereof toward the jaws 36, 38 and thereby tightens the jaws 36, 38 on the rail R. On the other hand, rotation of the wing nut 40 in an opposite direction moves the head 40B thereof away from the jaws 36, 38 and thereby loosens the jaws 36, 38 from the rail R.

Figure 3:
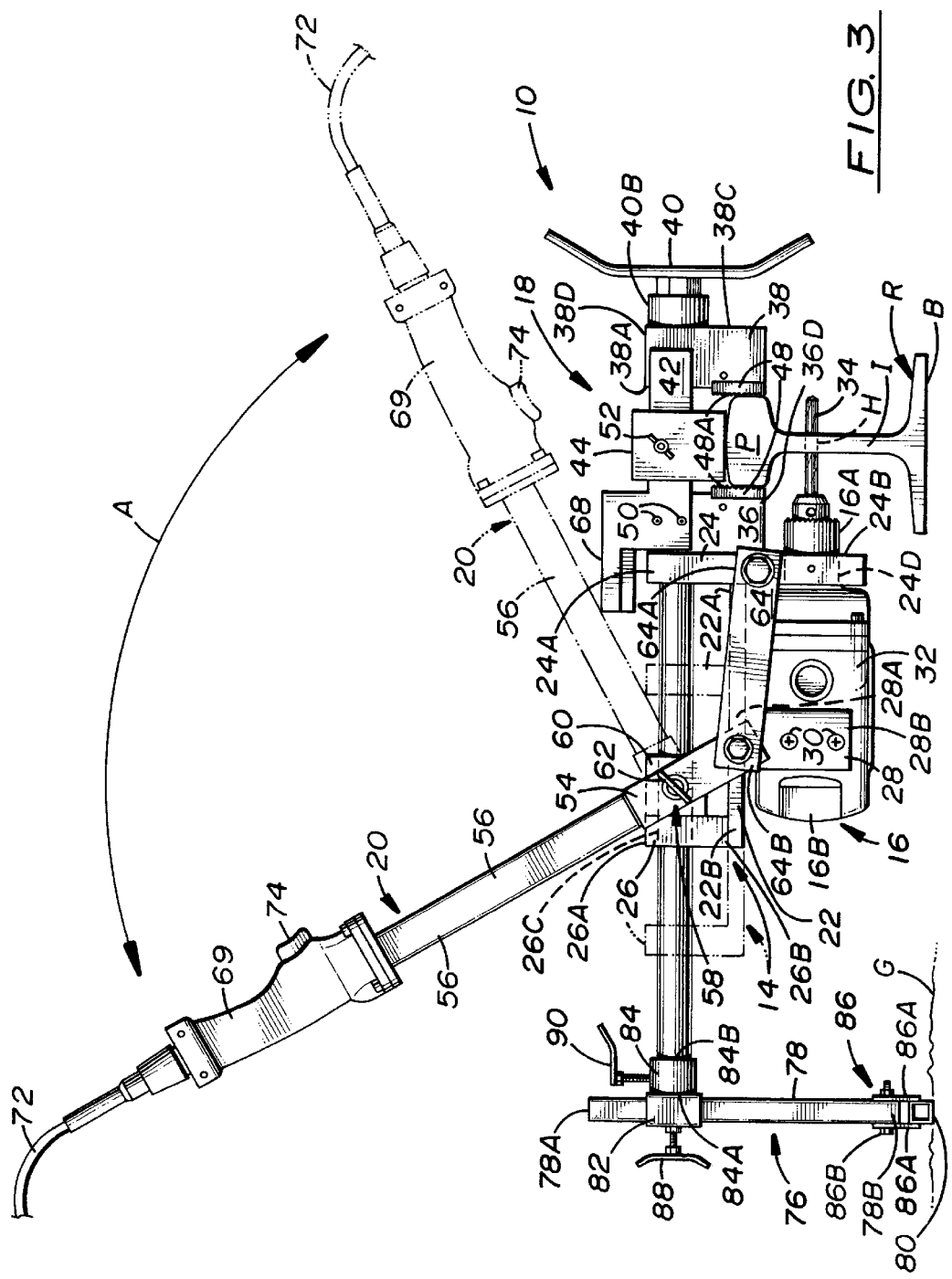
FIG. 3 is an enlarged side elevational view of the apparatus of FIG. 1, showing pivotal movement of the handle in the employed condition between forward and rearward positions.

The jaw guiding members 42 are disposed at opposite sides of the main shaft 12 and extend in substantially parallel relation to one another. Each jaw guiding member 42 is in the form of a flat plate of a substantially rectangular transverse configuration. The jaw guiding members 42 extend between and along the lateral sides 36D, 38D of the jaws 36, 38. Each jaw guiding member 42 is fixedly mounted to one of the lateral sides 36D of the stationary jaw 36. As seen in FIG. 3, the jaw guiding members 42 are fixedly secured by screws 50 to the opposite lateral sides 36D of the stationary jaw 36 and extend therefrom to along the opposite lateral sides 38D of the slidable jaw 38 so as to ensure that the slidable jaw 38 does not rotate about but only moves axially along the main shaft 12 as the wing nut 40 is threadably rotated onto and from the second end 12B of the main shaft 12 to tighten and loosen the clamp 18.

The rail gauging members 44 have flat rectangular configurations and are disposed at the opposite sides of the main shaft 12 between and spaced from the jaws 36, 38 and extend in substantially parallel relation to one another. The rail gauging members 44 are adjustably mounted by fasteners 52 to and extend downwardly below the respective jaw guiding members 42 so as to contact a top surface of the top portion P of the rail R. Thus, the vertical positions of the rail gauging members 44 can be adjustably preset relative to the jaw guiding members 42 so as to set the desired vertical position of the clamp 18 and thereby of the electric drill 16 relative to the top portion P of the rail R for ensuring that the hole H will be drilled at the desired location through the rail R.

The handle 20 of the drill apparatus 10 is hollow and has a substantially straight longitudinal configuration and a substantially rectangular transverse configuration. The handle 20 has a base portion 54 which is pivotally mounted to the main shaft 12 and an elongated main portion 56 which removably interfits with the base portion 54 to provide the straight longitudinal configuration. The main portion 56 of the handle 20 is substantially greater in length than the base portion 54 thereof.

The drill apparatus 10 also includes a handle mounting means 58 which pivotally mounts the handle 20 at its base portion 54 to the main shaft 12. The handle mounting means 58 includes a block-like mounting body 60 having a bore 60A receiving the main shaft 12 therethrough such that the mounting body 60 is slidably adjustable along the main shaft 12. The mounting body 60 is disposed between the forward and rearward vertical plates 24, 26 of the support frame 14. The handle base portion 54 has upper and lower sections 54A, 54B. The base portion 54 of the handle 20 at its lower section 54B is pivotally mounted at a side of the mounting body 60 of the handle mounting means 58. The handle mounting means 58 also includes a pin 62 having a T-shaped configuration which rotatably screws into and from the mounting body 60 to releasably secure it to and retain it at a desired position along the main shaft 12. Rotation of the pin 62 in one direction tightens the mounting body 60 relative to the main shaft 12 such that the lower section 54B of the base portion 54 of the handle 20 is retained stationary along the main shaft 12 but may pivot relative to the mounting body 60 as seen in FIGS. 3 and 4. Rotation of the pin 62 in an opposite direction loosens the mounting body 60 relative to the main shaft 12 such that the mounting body 60 may be slid along the main shaft 12. The lower section 54B of the base portion 54 of the handle 20 is pivotally coupled to the support frame 12 by a link 64 having a front end 64A and a rear end 64B. The front end 64A of the link 64 is pivotally mounted to the forward vertical plate 26 of the support frame 14 at an intermediate point between the upper and lower ends 26A, 26B adjacent to the horizontal plate 22 of the support frame 14. The rear end 64B of the link 64 is pivotally mounted to the lower section 54B of the handle base portion 54. The transverse size of the upper section 54A of the handle base portion 54 is smaller than that of the lower section 54B thereof and of the main portion 56 of the handle 20 such that the upper section 54A is insertable into and removable from an open lower end 56A of the main portion 56 of the handle 20 and a shoulder 54C on the lower section 54B functions as a stop to the insertion of the handle main portion 56 on the handle base portion 54.

Figure 2:
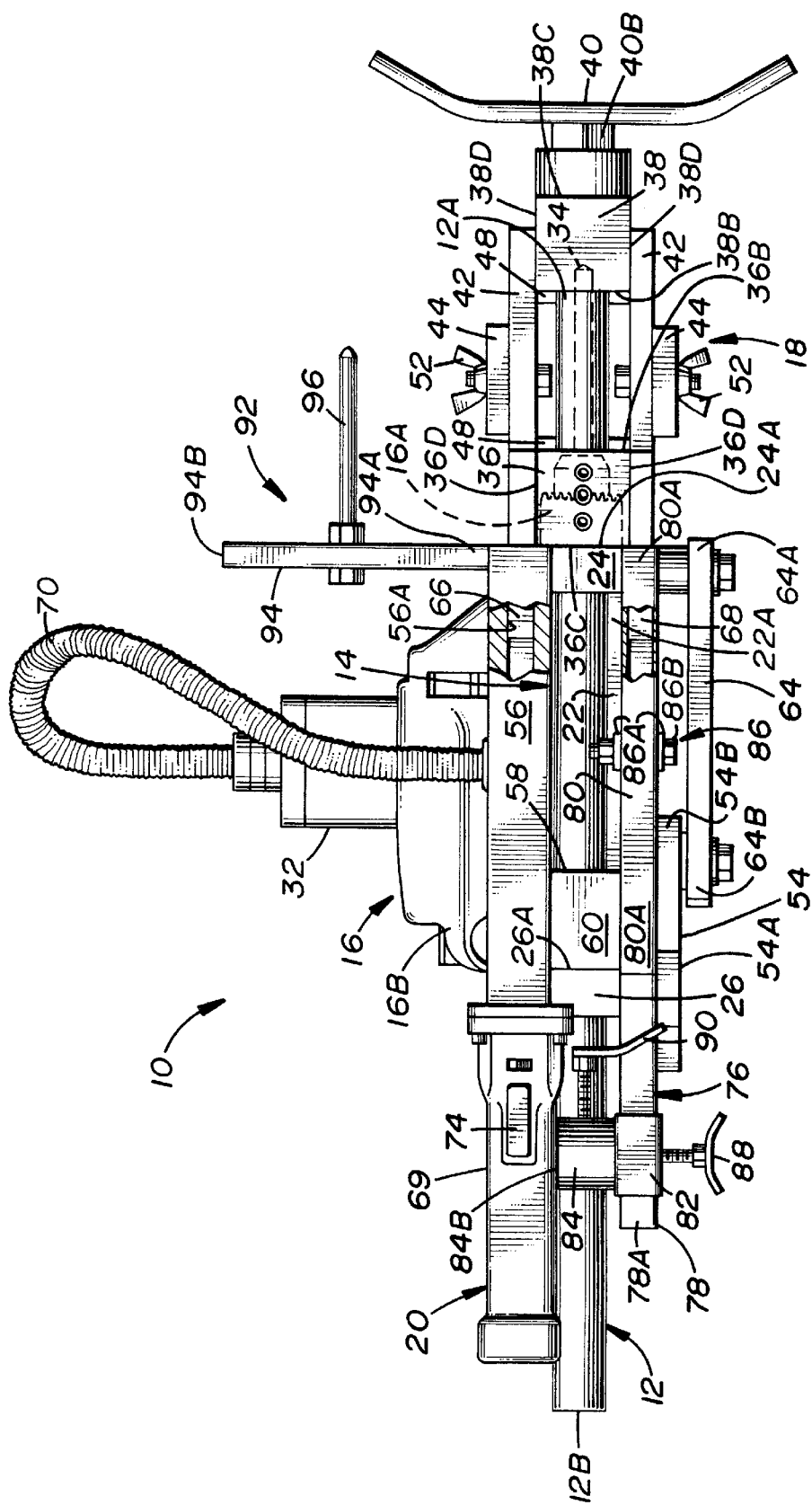
FIG. 2 is an enlarged top plan view of the apparatus of FIG. 1, showing both the handle and a support leg of the apparatus in a stored condition.

The handle 20 is movable between a stored condition, as shown in FIG. 2, and an employed condition, as shown in FIGS. 1, 3 and 4. The double-headed arrow A in FIG. 4 indicates the opposite directions of pivotal movement of the handle 20 in the employed condition between the rearward position shown in solid line form and the forward position shown in phantom. In the stored condition, the main portion 56 of the handle 20 is removed from the base portion 54 thereof and thus from the handle mounting means 58 and is brought into engagement with the clamp 18, particularly, with a respective one of a pair of support elements 66, 68 attached on and protruding from the stationary jaw 36 of the clamp 18. The one support element 66 receives and interfits with the lower open end 56A of the main portion 56 of the handle 20 so as to support the handle 20 in a substantially parallel relation to and above and adjacent to the main shaft 12 when the handle 20 is in the stored condition. The handle 20 in the employed condition has its main portion 56 fitted with its base portion 54, as described above, which, in turn, is pivotally mounted to the main shaft 12 by the handle mounting means 58.

The handle 20 also has a grip 69 formed on the main portion 56 thereof. The main portion 56 of the handle 20 also has an electrical cable 70 and an electrical cord 72 extending therefrom. The electrical cable 70 is connected to and extends between a switch 74 on the main portion 56 of the handle 20 and the motor 32 of the drill 16. The electrical cord 72 is connected to and extends between the main portion 56 of the handle 20 and a source of power (not shown), such as a 110 volt electrical outlet. The switch 74 is electrically connected to the cable 70 and cord 72. The switch 74 is provided for switching on and off the electric motor 32 of the drill 16.

The drill apparatus 10 further includes a support leg 76 having a substantially T-shaped configuration. The support leg 76 has a vertical leg member 78, a horizontal leg member 80, a height adjustment member 82, a shaft mounting member 84 and a connection member 86. The vertical leg member 78 and horizontal leg member 80 each has a substantially rectangular transverse cross-sectional configuration. The vertical leg member 78 has opposite upper and lower ends 78A, 78B. The length and the width of the vertical leg member 78 are substantially the same as the length and the width of the horizontal leg member 80.

The height adjustment member 82 has a substantially rectangular transverse configuration, is hollow and open at its opposite ends. The height adjustment member 82 has a width which is slightly greater than the width of the vertical leg member 78 for slidably fitting the vertical leg member 78 therethrough. The height adjustment member 82 has an internally threaded hole 82A threadably receiving a T-shaped pin 88. The pin 88 is rotatable in opposite directions to respectively tighten and loosen the vertical leg member 78 relative to the height adjustment member 82. Thus, rotation of the pin 88 in one direction tightens the vertical leg member 78 to the height adjustment member 82 such that the second end 12B of the main shaft 12 is set at a desired height above the ground G by the vertical leg member 78. Rotation of the pin 88 in an opposite direction loosens the vertical leg member 78 relative to the height adjustment member 82 such that the vertical leg member 78 may slide within the height adjustment member 82 to adjust its height above the ground G.

The shaft mounting member 84 has a pair of opposite ends 84A, 84B. The outer end 84A of the shaft mounting member 84 is fixedly connected to the height adjustment member 82 such that the outer end 84A is closed. The shaft mounting member 84 is in the form of a sleeve with the inner end 84B being open. The shaft mounting member 84 has a diameter which is slightly greater than the diameter of the second end 12B of the main shaft 12 for fitting the shaft mounting member 84 over the second end 12B of the main shaft 12. The shaft mounting member 84 has an internally threaded hole 84C threadably receiving an externally threaded L-shaped pin 90. The pin 90 is rotatable in opposite directions for tightening and loosening the shaft mounting member 84 relative to the main shaft 12. Thus, rotation of the pin 90 in one direction tightens the shaft mounting member 84 relative to the main shaft 12 such that the shaft mounting member 84 and therewith the support leg 76 are secured in place on the second end 12B of the main shaft 12. Rotation of the pin 90 in an opposite direction loosens the shaft mounting member 84 relative to the main shaft 12 such that the shaft mounting member 84 and therewith the support leg 76 may be removed from the second end 12B of the main shaft 12. When the height adjustment member 82 is loose relative to the vertical leg member 78 and the latter is then able to slide within the height adjustment member 82, the height of the shaft mounting member 84 above the ground G may be adjusted for positioning the second end 12B of the main shaft 12 at the desired height above the ground G.

The connection member 86 is a pair of plates 86A and a fastener 86B. The plates 86A have substantially rectangular configurations and are disposed in substantially parallel relation to one another and are attached to opposite sides and adjacent to the lower end 78B of the vertical leg member 78 and on opposite sides and at a point approximately halfway between opposite ends 80A of the horizontal leg member 80. The plates 86A and the lower end 78A of the vertical leg member 78 have respective holes (not shown) which are aligned and receive the fastener 86B therethrough so as to pivotally connect the vertical leg member 78 to the middle of the horizontal leg member 80 allowing the latter to be moved between substantially perpendicular and parallel positions relative to the vertical leg member 78.

The support leg 76 is convertable between a stored condition, as shown in FIG. 2, and a deployed condition, as shown in FIGS. 1, 3 and 4. The support leg 76 in the stored condition is removed from the main shaft 12 and one open end of the horizontal leg member 80 is interfitted with the support element 68 mounted to the clamp 18 with the horizontal leg member 80 extending generally parallel to the vertical leg member 78 such that the support leg 76 extends from the clamp 18 in a substantially parallel relation to and above and adjacent to the main shaft 12. The support leg 76 in the deployed condition is mounted to the second end 12B of the main shaft 12, as described above, and extends in a substantially perpendicular relation to the main shaft 12 such that the horizontal leg member 80 of the support leg 76 being in a generally perpendicular relation to the vertical leg member 78 rests on the ground G and the support leg 76 supports and retains the second end 12B of the main shaft 12 above the ground G.

The drill apparatus 10 further include a drill gauge member 92. The drill gauge member 92 includes a horizontal mounting bar 94 and a gauge pin 96. The horizontal mounting bar 94 is mounted at an inner end 94A to the lower end 24B of the forward vertical plate 24 of the support frame 14 and extends outwardly from and in substantially perpendicular relation to the forward vertical plate 24. The gauge pin 96 is fixedly mounted to the horizontal mounting bar 94 at a point between the opposite inner and outer ends 94A, 94B thereof. The gauge pin 96 extends forwardly thereof and is disposed in substantially perpendicular relation thereto. The gauge pin 96 is insertable within a hole in the intermediate portion I of the rail R which has been previously made by the drill 16 for precisely setting and guiding the placement of the drill bit 34 in the process of drilling another hole in the intermediate portion I of the rail R.

In conclusion, as seen in FIG. 4, the double-headed arrow A indicates the opposite directions of pivotal movement of the handle 20 in the employed condition between the rearward and forward positions, another double-headed arrow B indicates the opposite directions of reciprocal movement of the support frame 14 on the main shaft 12, still another double-headed arrow C indicates the opposite directions of reciprocal movement of the electric drill 16 with the reciprocal movement of the support frame 14, yet another double-headed arrow D indicates directions of movement of the movable or slidable jaw 38 of the clamp 18 relative to the stationary jaw 36 of the clamp 18, and a final double-headed arrow E indicates the direction of movement of the handle 20 for mounting the main portion 56 of the handle 20 to and dismounting the main portion 56 of the handle 20 from the base portion 54 thereof which is pivotally secured to the handle mounting body 60 on the main shaft 12.

Where possible, the above-described components of the portable drill apparatus 10 are preferably made of aluminum material so as to reduce weight of the apparatus 10 while maintaining its strength. All moving parts preferably are machined for a precise fit.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A portable electric railroad rail drill apparatus, comprising:

(a) an elongated main shaft having opposite first and second ends;

(b) a support frame reciprocally mounted to said main shaft for movement therealong between said first and second ends of said main shaft;

(c) an electric drill fixedly mounted to said support frame and reciprocally movable therewith along said main shaft;

(d) means for mounting said main shaft at a location adjacent to said first end thereof to a railroad track rail such that said electric drill is disposed adjacent to the rail and movable along said main shaft toward and away from the rail and is operable for drilling a hole through the rail concurrently with movement toward the rail;

(e) a handle convertible between a stored condition and an employed condition, said handle in said stored condition being mounted to said shaft mounting means and extending along and adjacent to said main shaft, said handle in said employed condition being pivotally mounted to said main shaft and extending upwardly therefrom; and (f) means for pivotally mounting said handle to said main shaft such that said handle is pivotally movable. between forward and rearward positions relative to the rail to cause movement of said support frame along said main shaft and thereby said electric drill toward and away from the rail for drilling the hole through the rail and removing said electric drill from the hole.

2. The apparatus of claim 1 wherein said electric drill is disposed below said main shaft.

3. The apparatus of claim 1 wherein said handle includes:
a base portion pivotally mounted by said handle mounting means to said main shaft; and
an elongated main portion removably fitting with said base portion and extending therefrom through a length substantially greater than a length of said base portion.

4. The apparatus of claim 3 wherein said shaft mounting means includes a clamp mounted at said location adjacent said first end of said main shaft, said clamp including a pair of jaws, one of said jaws being movable toward and away from the other of said jaws, said jaws receiving the rail therebetween such that movement of said one of said jaws toward said other of said jaw tightens said jaws onto the rail and movement of said one of said jaws away from said other of said jaws loosens and allows removal of said jaws from the rail such that said clamp removably mounts said main shaft to the rail.

5. The apparatus of claim 4 wherein said clamp further includes a wing nut rotatably mounted to said first end of said main shaft and movable toward and away from said jaws such that rotation of said wing nut in one direction moves said wing nut toward said jaws and thereby tightens said jaws and rotation of said wing nut in an opposite direction moves said wing nut away from said jaws and thereby loosens said jaws.

6. The apparatus of claim 1 wherein said handle is convertable between a stored condition and an employed condition, said handle in said stored condition being mounted to said shaft mounting means and extending above and adjacent to said main shaft, said handle in said employed condition being pivotally mounted to said main shaft and extending upwardly therefrom.

7. A portable electric railroad rail drill apparatus, comprising:
(a) an elongated main shaft having opposite first and second ends;
(b) a support frame reciprocally mounted to said main shaft for movement therealong between said first and second ends of said main shaft;

(c) an electric drill fixedly mounted to said support frame and reciprocally movable therewith along said main shaft;

(d) means for mounting said main shaft at a location adjacent to said first end thereof to a railroad track rail such that said electric drill is disposed adjacent to the rail and movable along said main shaft toward and away from the rail and is operable for drilling a hole through the rail concurrently with movement toward the rail;

(e) a handle;

(f) means for Pivotally mounting said handle to said main shaft such that said handle is pivotally movable between forward and rearward positions relative to the rail to cause movement of said support frame along said main shaft and thereby said electric drill toward and away from the rail for drilling the hole through the rail and removing said electric drill from the hole; and (g) a support leg movable between a stored condition and a deployed condition, said support leg in said stored condition being mounted to said shaft mounting means and extending above and adjacent to said main shaft, said support leg in said deployed condition being mounted to said second end of said main shaft and extending in a substantially transverse relation to said main shaft such that said support leg rests on the ground and supports and retains said second end of said main shaft above the ground.

8. A portable electric railroad rail drill apparatus, comprising:
(a) an elongated main shaft having opposite first and second ends;
(b) a support frame reciprocally mounted to said main shaft for movement therealong between said first and second ends of said main shaft;
(c) an electric drill fixedly mounted to said support frame and reciprocally movable therewith along said main shaft;
(d) a clamp mounted at a location adjacent to said first end of said main shaft for mounting said main shaft to a railroad track rail such that said electric drill is disposed adjacent to the rail and movable along said main shaft toward and away from the rail and is operable for drilling a hole through the rail concurrently with movement toward the rail; and
(e) a handle convertible between a stored condition and an employed condition, said handle in said stored condition being mounted to said clamp and extending therefrom above and adjacent to said main shaft, said handle in said employed condition being pivotally coupled to said support frame and pivotally mounted to said main shaft and extending upwardly therefrom such that said handle is pivotally movable between forward and rearward positions relative to the rail to cause movement of said support frame along said main shaft and thereby said electric drill toward and away from the rail for drilling the hole through the rail and removing said electric drill from the hole.

9. The apparatus of claim 8 wherein said electric drill is disposed below said main shaft.

10. The apparatus of claim 8 wherein said handle includes:
a base portion pivotally mounted to said main shaft; and
an elongated main portion removably connected with said base portion and extending therefrom through a length substantially greater than a length of said base portion, said main portion being connected with said base portion in said employed condition of said handle and removed from said base portion in said stored condition of said handle.

11. The apparatus of claim 10 wherein said shaft mounting means includes a clamp mounted at said location adjacent said first end of said main shaft, said clamping includes a pair of jaws, one of said jaws being movable toward and away from the other of said jaws, said other of said jaws being stationary and having a support element for mounting said main portion of said handle in said stored condition, said jaws receiving the rail therebetween such that movement of said one of said jaws toward said other of said jaws tightens said jaws onto the rail and movement of said one of said jaws away from said other of said jaws loosens and allows removal of said jaws from the rail such that said clamp removably mounts said main shaft to the rail.

12. The apparatus of claim 11 wherein said clamp further includes a wing nut rotatably mounted to said first end of said main shaft and movable toward and away from said jaws such that rotation of said wing nut in one direction moves said wing nut toward said jaws and thereby tightens said jaws and rotation of said wing nut in an opposite direction moves said wing nut away from said jaws and thereby loosens said jaws.

13. The apparatus of claim 8 further comprising:

a support leg movable between a stored condition and a deployed condition, said support leg in said stored condition being mounted to said clamp and extending therefrom and above and adjacent to said main shaft, said support leg in said deployed condition being mounted to said second end of said main shaft and extending in a substantially transverse relation to said main shaft such that said support leg rests on the ground and supports and retains said second end of said main shaft above the ground.

14. The apparatus of claim 13 wherein said clamp includes a pair of jaws, one of said jaws being movable toward and away from the other of said jaws, said other of said jaws being stationary and having a support element for mounting said support leg in said stored condition.

15. A portable electric railroad rail drill apparatus, comprising:

(a) an elongated main shaft having opposite first and second ends;

(b) a support frame reciprocally mounted to said main shaft; for movement therealong between said first and second ends of said main shaft;

(c) an electric drill fixedly mounted to said support frame and reciprocally movable therewith along said main shaft;

(d) a clamp mounted at a location adjacent to said first end of said main shaft for mounting said main shaft to the rail such that said electric drill is disposed adjacent to the rail and movable along said main shaft toward and away from the rail and is operable for drilling a hole through the rail concurrently with movement toward the rail;

(e) a handle pivotally coupled to said support frame and pivotally mounted to said main shaft and extending upwardly therefrom such that said handle is pivotally movable between forward and rearward positions relative to the rail to cause movement of said support frame along said main shaft and thereby said electric drill toward and away from the rail for drilling the hole through the rail and removing said electric drill from the hole; and (f) a support leg convertible between a stored condition and a deployed condition, said support leg in said stored condition being mounted to said clamp and extending therefrom and above and adjacent to said main shaft, said support leg in said deployed condition being mounted to said second end of said main shaft and extending in a substantially transverse relation to said main shaft such that said support leg rests on the ground and supports and retains said second end of said main shaft above the ground.

16. The apparatus of claim 15 wherein said electric drill is disposed below said main shaft.

17. The apparatus of claim 15 wherein said handle includes:

a base portion pivotally mounted to said main shaft; and an elongated main portion removably fitting with said base portion and extending therefrom through a length substantially greater than a length of said base portion.

18. The apparatus of claim 15 wherein said clamp includes a pair of jaws, one of said jaws being movable toward and away from the other of said jaws, said other of said jaws being stationary and having a support element for mounting said support leg in said stored condition.

19. The apparatus of claim 18, wherein said jaws receive the rail therebetween such that movement of said one of said jaws toward said other of said jaws tightens said jaws onto the rail and movement of said one of said jaws away from said other of said jaws loosens and allows removal of said jaws from the rail such that said clamp removably mounts said main shaft to the rail.

20. The apparatus of claim 19 wherein said clamp further includes a wing nut rotatably mounted to said first end of said main shaft and movable toward and away from said jaws such that rotation of said wing nut in one direction moves said wing nut toward said jaws and thereby tightens said jaws and rotation of said wing nut in an opposite direction moves said wing nut away from said jaws and thereby loosens said jaws.

* * * * *